Dec. 10, 1929.  B. J. F. ANDERSSON  1,739,476

NUT LOCK

Filed Feb. 3, 1927

Inventor:

Bror John Fritihof Andersson

Patented Dec. 10, 1929

1,739,476

UNITED STATES PATENT OFFICE

BROR JOHN FRITHIOF ANDERSSON, OF STOCKHOLM, SWEDEN

NUT LOCK

Application filed February 3, 1927, Serial No. 165,587, and in Sweden March 19, 1925.

The invention relates to nut locks and the object is to provide a device for securing a reliable locking of nuts.

Figure 1:
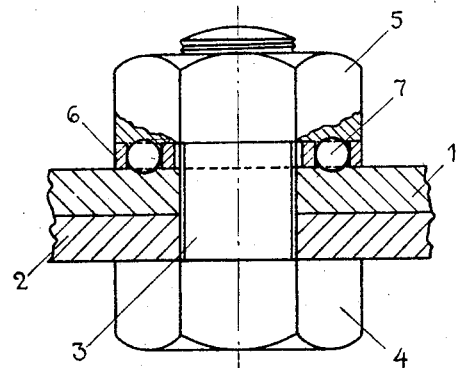

In the accompanying drawing, Fig. 1 is an elevation, with parts thereof in section, of a bolt and nut provided with my improved locking means.

Figure 2:
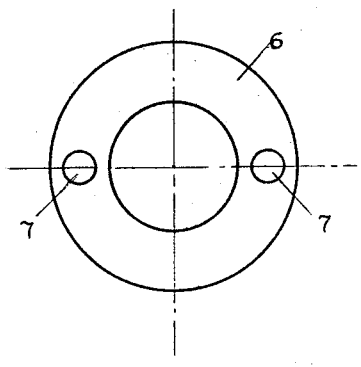

Fig. 2 is an end view of the locking washer.

With reference to Figs. 1 and 2, the numerals 1 and 2 indicate two members to be screwed together. 3 is the stem of the screw bolt, 4 is the head of said bolt, and 5 is the nut engaging the said screw. Between the nut 5 and the member 1, a circular washer 6 is placed. In the said washer is formed one or several cylindrical holes in which a corresponding number of hardened steel balls 7 are inserted. The diameters of the balls are so chosen that the balls extend slightly above and below the washer.

The degree to which the balls 7 extend beyond the surfaces of the washer is such that when the nut is tightened by a suitable power, the above mentioned balls will produce a permanent deformation of the surface of the member 1 and of the bearing surface of the nut 5. These deformations which have the shape of spherical recesses, will then prevent any subsequent movement between the nut 5 and the member 1.

Having now described my invention I declare that what I claim is:

The combination of a nut having a plane bearing surface of relatively soft material a circular washer provided with one or several cylindrical holes and a corresponding number of balls of material relatively hard in comparison with that of said bearing surface inserted in said holes, said balls having such a diameter that they extend slightly beyond both of the plane surfaces of the washer to engage with rolling friction, said bearing surface and a similar underlying bearing surface, so as to deform said surfaces and thereby lock the nut.

In testimony whereof I have signed my name.

BROR JOHN FRITHIOF ANDERSSON.